United States Patent [19]

Wright

[11] Patent Number: 4,904,133
[45] Date of Patent: Feb. 27, 1990

[54] FASTENER WITH INTEGRAL LOCKING MEANS

[75] Inventor: Jewel L. Wright, Santa Ana, Calif.

[73] Assignee: Textron Inc., Providence, R.I.

[21] Appl. No.: 217,318

[22] Filed: Jul. 11, 1988

[51] Int. Cl.⁴ .................. F16B 13/04; F16B 13/06; B21D 39/00
[52] U.S. Cl. ........................... 411/43; 411/70; 29/512; 29/524.1
[58] Field of Search .................. 411/34–38, 411/40, 41, 43, 69, 70; 29/524.1, 526.2, 509, 512

[56] References Cited

U.S. PATENT DOCUMENTS

| | | |
|---|---|---|
| 2,371,452 | 3/1945 | Lees, Jr. .................. 411/70 |
| 3,114,921 | 12/1963 | Carusi . |
| 3,178,989 | 4/1965 | Siebol . |
| 3,194,106 | 7/1965 | Carusi et al. . |
| 3,230,818 | 1/1966 | Siebol . |
| 3,232,162 | 2/1966 | Ketchum .................. 411/70 |
| 3,285,121 | 11/1966 | Siebol . |
| 3,292,482 | 12/1966 | Fry et al. .................. 411/43 |
| 3,657,957 | 4/1972 | Siebol . |
| 4,137,817 | 2/1979 | Siebol . |

FOREIGN PATENT DOCUMENTS

| | | | |
|---|---|---|---|
| 209951 | 8/1957 | Australia .................. 411/43 |
| 427160 | 11/1947 | Italy .................. 411/43 |
| 759761 | 9/1980 | U.S.S.R. .................. 411/43 |
| 2177770 | 1/1987 | United Kingdom .................. 411/43 |

OTHER PUBLICATIONS

Copy of p. 21 from a Cherry Fastener Catalog showing the Cherry T Rivet ®.

Primary Examiner—Neill R. Wilson
Attorney, Agent, or Firm—Knobbe, Martens, Olson & Bear

[57] ABSTRACT

A blind fastener for securely and economically fastening a plurality of members having a mandrel with an enlarged head and a generally cylindrical stem with a locking groove, and a sleeve with a generally tubular portion surrounding a portion of the stem, a flange extending radially from the end of the tubular portion opposite the stem head, and a boss extending axially from the flange opposite the tubular portion, so that application of tension to the stem and compression to the boss causes upsetting of the fastener, compression of the members, elongation of the stem, and displacement of the boss material into the locking groove, thereby locking the mandrel and sleeve to prevent them from springing back upon breaking of the mandrel stem.

8 Claims, 4 Drawing Sheets

FASTENER WITH INTEGRAL LOCKING MEANS

BACKGROUND OF THE INVENTION

This invention relates in general to fasteners and more particularly to an improved fastener apparatus and method for obtaining a high clinching force and a securely maintained broken mandrel portion in installed commercial fasteners.

A blind rivet is generally composed of two pieces. The first piece is the mandrel, which is composed of a cylindrical stem having an enlarged head at one end. The second piece is the sleeve, a generally tubular member surrounding a portion of the mandrel stem and abutting the mandrel head, with an outwardly protruding flange at the end opposite the mandrel head.

In use, such a fastener is typically placed in the pulling head of a powered fastener installation device and directed to the workpiece, which commonly consists of a plurality of members to be fastened. In other instances, the fastener is placed in the workpiece and the powered fastener installation device then applied to it. In either case, the stem of the fastener is gripped by the jaws of the fastener installation device pulling head, which is then operated by hydraulic pressure to clamp the jaws radially about the fastener stem and pull the stem rearward away from the workpiece. At the same time, a reactive force is applied to the sleeve flange, urging it forward against the workpiece. The tension on the stem pulls the stem head against the sleeve, thereby upsetting the sleeve. The sleeve may be upset by collapsing it, as shown in U.S. Pat. No. 3,230,818, issued Jan. 25, 1966 to G. Siebol, or by splittinq it, as shown in U.S Pat. No. 3,114,921, issued Dec. 24, 1963 to A. Carusi.

Once the sleeve has been upset, the sleeve flange and mandrel head clamp the members of the workpiece together. After the fastener sleeve is upset in the manner described above, and the workpiece members are clinched together, resistance to the pin movement, and thus tension in the pin, increases under the continued application of the pulling force. It is conventional in the art to provide the pin with a weakened section, termed a "breakneck" groove. The pin is designed to fracture at the breakneck groove when the tension reaches a predetermined maximum, whereupon the pulling section of the stem separates from the remainder thereof disposed within the sleeve.

A longstanding problem with these blind fasteners of the prior art is that the resilient metal of the mandrel and sleeve, which is strained during setting, tends to spring back when the forces are rapidly released by the fracture of the stem at the breakneck groove. As a result, the clinching force on the workpiece is relaxed, which results in a reduction of both tensile and shear strength of the connection. The joint is likely to become loose and completely unsatisfactory in some applications.

The prior art has long recognized this problem and has developed a number of approaches to overcome it. One approach has been to provide the sleeve with a boss protruding from the face of the flange opposite the tubular portion and provide a sharp, conically-shaped groove which is undercut in the face of the flange surrounding the boss. The prior art teaches various ways to use this boss and undercut flange. For example, in U.S. Pat. No. 3,657,957, issued Apr. 25, 1972 to G. Siebol and U.S. Pat. No. 4,137,817, issued Feb. 6, 1979 to G. Siebol, it is taught that the nosepiece of the fastener installation tool urges the boss toward the workpiece until the generally triangular boss is wedged inward into a groove in the stem and the boss has completely separated from the surrounding flange. The boss forms a separate locking ring in this method.

Another variant of the boss and undercut flange is shown in U.S. Pat. No. 3,178,989, issued Apr. 20, 1965 to G. Siebol, which shows a boss and undercut flange arrangement in which the boss is urged into the mandrel stem grooves and into a flush relation with the sleeve flange without separating from the flange A different arrangement is shown in U.S. Pat. No. 3,192,821, issued July 6, 1965 to G. Siebol, in which the boss is undercut rather than the flange. As shown in FIGS. 10 and 11 of the '821 patent, application of the fastener nosepiece to the boss causes the boss material to be deformed into the mandrel stem grooves as a result of the moment induced by the undercut in the boss.

The problem with all of the aforementioned prior art is that each requires an undercut, either in the flange or in the boss. Such an undercut is virtually impossible to form in the conventional cold-forming process used to manufacture blind fastener sleeves. Rather, these undercuts are formed by a separate machining step. The addition of this machining step to the manufacture of the fastener renders these fasteners prohibitively expensive for general commercial use. Indeed, the application of such fasteners has been limited to use in relatively expensive aerospace applications.

In order to provide an economical but positive lock between the sleeve and mandrel, the prior art has looked to the design of the fastener installation tool rather than the fastener itself. For example, in U.S. Pat. No. 3,230,818, issued Jan. 25, 1966 to G. Siebol, a substantially cylindrical boss is shown extending from the flange. This boss is adapted to be radially compressed into the mandrel stem grooves by use of a specially designed nosepiece of the fastener installation device. Another prior art approach to nosepiece design is exemplified by the nosepieces having a protruding anvil for use with the popular Cherry T Rivet ®. The protruding nosepiece anvil displaces the material of the flange itself into the grooves in the mandrel to form a positive lock.

The primary problem with the Cherry T Rivet ® and the fastener of the '818 patent is that use of these fasteners requires a special fastener installation tool nosepiece. This requirement has always posed a problem in that these nosepieces are more complicated and more expensive than the standard flat nosepiece. Further, they tend to wear and break, thereby reducing the effectiveness of installation of the fastener. Because the operators of such equipment may be relatively unskilled, the worn or broken nosepiece may go unnoticed. Thus, a large number of fasteners may be improperly installed before the defective nosepiece is discovered. This can lead to very expensive repair of the workpiece with concomitant downtime.

The traditional problems with specially configured fastener installation tool nosepieces have been exacerbated by the recent application of powered fastener installation devices to automated assembly. These robot-mounted devices require a sturdy and simple design of the nosepiece so as to reduce the potential for error and downtime. The high installation volume and inability of the automated power fastener installation device to detect defects in the nosepiece render this problem critical. Thus, there exists a need for a fastener that is economical to produce, does not require a special configuration of the nosepiece of the fastener installation device, but yet achieves a high clinching force in the fastened members by preventing spring back of the fastener components.

SUMMARY OF THE INVENTION

The fastener of the present invention has a mandrel with an enlarged head and a generally cylindrical stem extending from the head. The stem has a locking groove spaced from the head. The fastener also has a sleeve with a generally tubular portion surrounding a portion of the stem, a flange extending radially from the end of the tubular portion opposite the head, and a boss, which extends axially from the flange opposite the tubular portion and joins the flange without an undercut in either the flange or boss. The cross-sectional area of the axially outer boss end is smaller than the cross-sectional area of the axially inner boss end. Continued application of the pulling force to the fastener after the sleeve tubular portion has been upset, the workpiece members have been clinched, and the stem has been elongated, results in displacement of the boss material into the locking groove, thereby locking the mandrel and sleeve to prevent them from springing back upon breaking of the mandrel stem. This fastener may be used with conventional flat nosepieces or with others, including the nosepiece used for the popular Cherry T Rivet ®.

DETAILED DESCRIPTION OF THE PREFERRED EMBODIMENT

Figure 1:
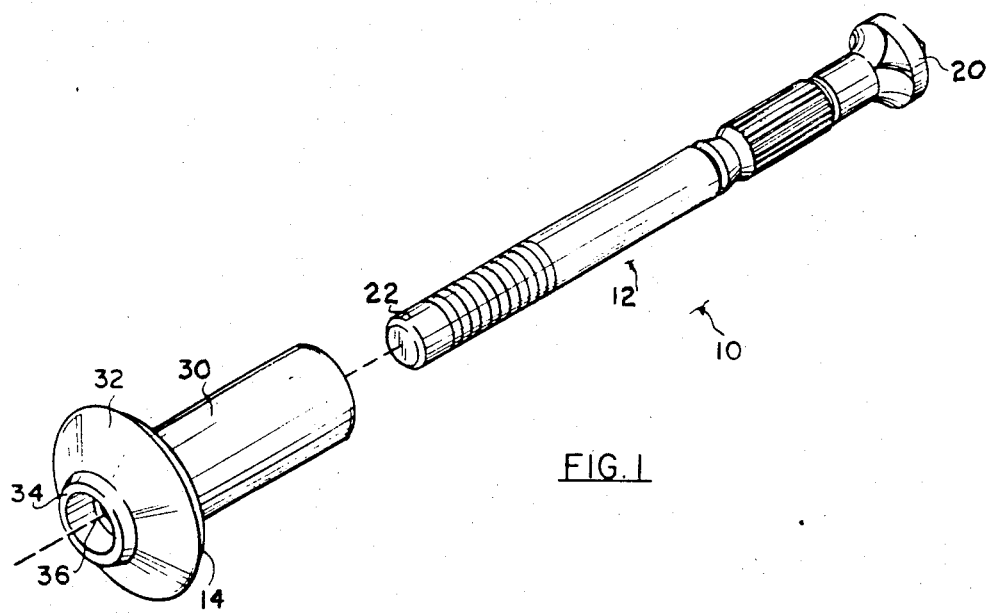
FIG. 1 is an exploded perspective view of the fastener of the preferred embodiment of the present invention.

Referring to FIG. 1, the fastener 10 of the present invention has two pieces, a mandrel 12 and a sleeve 14. The mandrel 12 is composed of two sections, an enlarged head 20 and a generally cylindrical stem 22. The sleeve 14 has three portions, a tubular portion 30, a disc-like radially extending flange 32 joined to the end of the tubular portion 30, and a boss 34 protruding from the flange 32. Extending throughout the sleeve 14 is a cylindrical bore 36. The bore 36, tubular portion 30, flange 32, and boss 34 are all generally coaxial.

Figure 2:
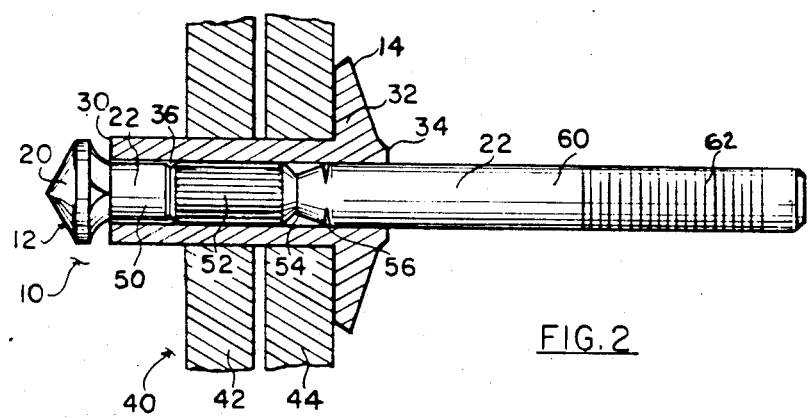
FIG. 2 is a cross-sectional view of the fastener of the present invention placed in a workpiece.

Referring to FIG. 2, the fastener 10 of the present invention in shown inserted into a workpiece 40 consisting of two sheet-like members 42, 44. It will be understood that the present invention can be employed to fasten more than two members in a single workpiece. For example, a sheet-like gasket (not shown) could be employed between the members 42, 44 or between the member 44 and the flange 32 to provide a fluid-tight seal at the connection.

The fastener mandrel stem 22 includes several sections as shown in FIG. 2. For example, stem 22 may include a smooth cylindrical shank 50 adjacent the head 20. Conveniently provided adjacent the shank 50 is a raised knurl 52. The raised knurl 52 creates an interference fit with the bore 36 of the sleeve 14. This interference fit is desired to prevent the fastener components 12, 14 from separating after assembly and before insertion into the workpiece 40. Adjacent the raised knurl 52 is a locking groove 54. The purpose and design parameters of the locking groove will be discussed more fully below.

Adjacent the locking groove 54 is a breakneck groove 56. The breakneck groove 56 provides a predetermined location at which the stem 22 fractures upon reaching its maximum tensile stress. As is commonly known in the fastener manufacturing art, the breakneck groove 56 is formed by rolling a sharp V-shaped groove, which is then rolled back shut.

To the right of the breakneck groove 56 in FIG. 2 is shown a front, smooth, cylindrical shank portion 60. This portion may be provided with grooves or serrations 62 to enhance gripping by the fastener installation device 70.

Figure 3:
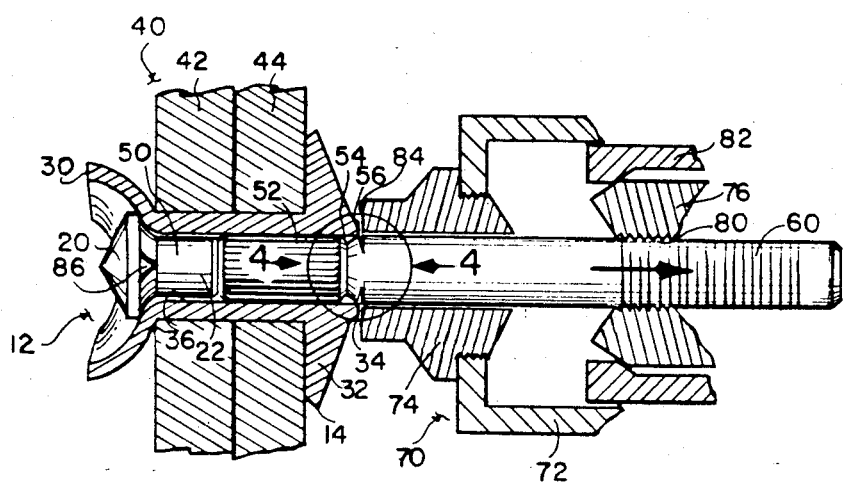
FIG. 3 is a cross-sectional view of the fastener of FIG. 2 with a fastener installation device positioned against the fastener after the sleeve tubular portion has been upset, the workpiece members have been clinched, and the fastener stem has been elongated.

FIG. 3 shows a fastener installation device 70 placed against the fastener 10 so that a planar front surface 84 of a nosepiece 74 abuts the fastener sleeve boss 34. The fastener installation device 70 includes a housing 72, into which is threadedly received nosepiece 74. To the right of nosepiece 74 in FIG. 3 are shown jaws 76. Jaws 76 have a serrated surface 80 which grip and pull the mandrel stem 22 upon rearward movement of a collet 82. The details of the pulling head 70 are well-known to those of ordinary skill in the fastener manufacturing art and warrant no further discussion here.

The fastener 10, workpiece 40 and fastener installation device 70 in FIG. 3 are shown after a pulling force has been applied in the direction of the arrow on the stem 22 sufficient to upset the sleeve tubular portion 30 and clinch together workpiece members 42, 44. The mandrel head 20 is shown provided with splitting wedges 86 for initiating splitting of the sleeve tubular portion 30. The same result may be obtained by other means, such as providing lines of weakness in the sleeve tubular portion 30, as shown in U.S. Pat. No. 3,194,106, issued July 13, 1965 to A. Carusi, et al. The mandrel stem 22 is shown to be moved and elongated to a point where the locking groove 54 is adjacent the sleeve boss 34.

Figure 4:
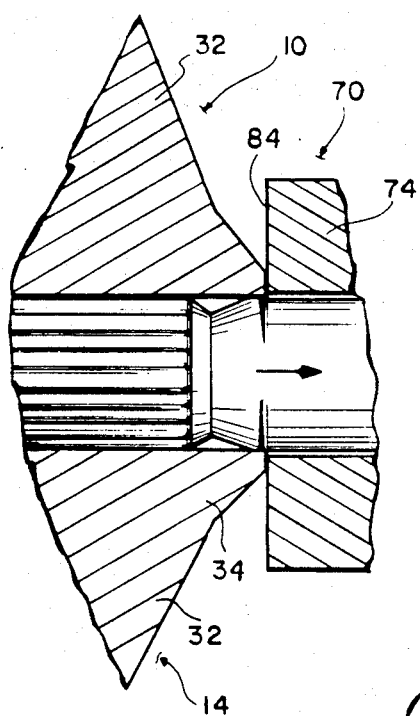
FIG. 4 is a cross-sectional detail view of the locking boss area of FIG. 3.

FIG. 4 is a detail view of the area of contact between the fastener installation device 70 and the sleeve boss 34, showing the boss 34 and a portion of the flange bridging the locking groove 54, before the boss 34 has been deformed.

Figure 5:
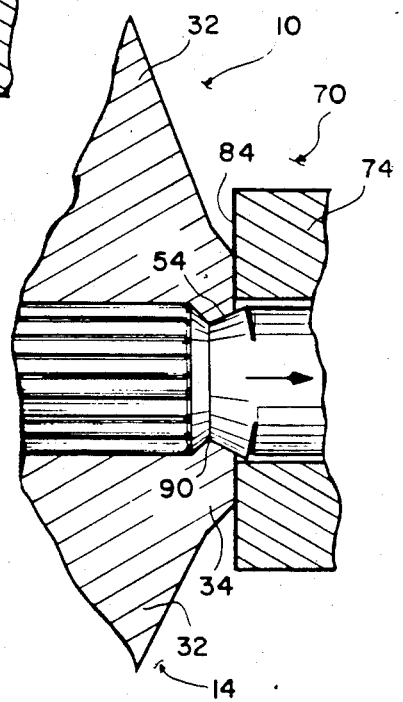
FIG. 5 is a cross-sectional detail view of the locking boss of FIG. 4 after the locking boss has been deformed into the groove in the mandrel stem.

FIG. 5 shows the area of FIG. 4 after a further pulling force in the direction of the arrow on stem 22 has been applied, resulting in deformation of the boss material, some of which has been urged into locking groove 54 and filling the locking groove 54 to form a locking collar 90. Although a single locking groove 54 is shown, a plurality of locking grooves may be conveniently utilized. The single large locking groove 54 has an advantage over a plurality of smaller locking grooves in that less force is required to deform the boss material into a single large locking groove 54. However, a series of smaller radial or axial locking grooves might provide better locking and retention under some circumstances, for example, with some combinations of mandrel and sleeve materials. Thus, one of ordinary skill in the fastener manufacturing art will appreciate that various configurations of locking grooves may be utilized for various applications.

Figure 6:
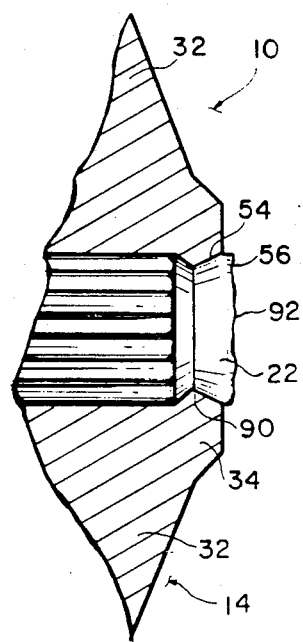
FIG. 6 is a cross-sectional detail view of the locking boss area of the completely installed fastener.

FIG. 6 shows the area of FIG. 4 after the fastener 10 has been fully installed in the workpiece 40. The fastener stem 22 is shown broken at break 92 adjacent breakneck groove 56. When the pulling force is removed from the stem 22 by virtue of the stem breaking, the mandrel 12 and sleeve 14 are prevented from springing back by the intrusion of boss material in the form of locking collar 90 into locking groove 54. Thus, the installed fastener 10 shown in FIG. 6 results in a securely fastened joint in which the full clinching force between the fastener 10 and the fastened members 42, 44 is maintained.

Referring further to FIG. 6, the boss 34 is shown projecting above or axially beyond the surface of the flange 32. It will be appreciated that it is preferred that the amount of material used in the sleeve 14 be reduced by matching the volume of boss material to the volume of the locking groove 54. In that case, the boss 34 would be flattened against the flange 32 upon installation. This flattening also provides a visual indication that the fastener components have been installed in such a manner to prevent the mandrel 12 and sleeve 14 from springing back once the stem 22 breaks.

Figure 7:
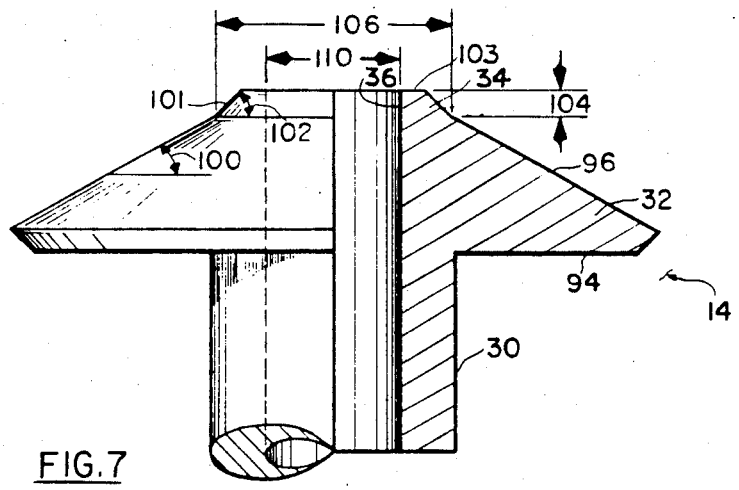
FIG. 7 is a partial cross-sectional detail view of the fastener sleeve of the present invention.

Shown in FIG. 7 is the preferred embodiment of the flange and boss configuration of the present invention. Flange 32 has an axially inner face 94 for contacting the workpiece 40. Inner face 94 may be substantially planar, as shown, or another shape, depending on the application, such as frusto-conical, as shown in U.S. Pat. No. 3,657,957, issued Apr. 25, 1972 to G. Siebol. An axially outer face 96 of the flange 32 is frusto-conical, being inclined from the horizontal, as shown in FIG. 6, at an angle 100 of 20-25°, preferably 22.5°. The outer flange face 96 need not be frusto-conical, but could be planar or curved as well. A radially outer side surface 101 of the boss 34 is also preferably frusto-conical, being inclined from the horizontal, as shown in FIG. 7, by an angle 102 preferably of 35° to 60°, and particularly preferably 45°. Although the present invention may begin to work marginally at an angle 102 of around 20° for certain combinations of sleeve and mandrel materials, top and bottom boss cross-sectional areas, and the available mandrel load, it has been found preferable to use an angle 102 in the range of 35° to 60°. Under this relationship, the boss side 101 also forms a supplementary angle of 145° to 120°, and preferably 135°, with a planar boss axially outer end surface 103 which is perpendicular to the fastener axis. This angle in the boss side 101 acts to urge deformation of the boss material inward into the mandrel locking groove 54. The angle on the boss side surface 101 induces the deformation of the boss 34 to begin at bore 36. This is because the angle resists compression, while the bore 36 is unobstructed, due to the clearance between the stem 22 and the bore 36. The clearance is afforded by provision of the raised knurl 52. This configuration provides the additional benefit that it is easily formed by conventional cold forming methods and does not require an additional machining step to manufacture. Neither the flange 32, nor the boss 34 are interrupted by any form of undercut.

The boss outer end 103 is shown as a planar surface, but it could be a sharp break. It has been found preferable to form a planar surface as shown for providing means to register the fastener installation device nosepiece 74 to provide for a uniform and straight application of compression to the boss 34.

By way of example, for a 5056 Aluminum mandrel 12 with a nominal shank size of ¼ inch, the inventor has found it preferable to form the boss 34 with an outside diameter 106 of 0.210 inch and an angle 102 of 45° from horizontal as shown in FIG. 7. The diameter 110 of bore 36 is 0.162 inch. The height 104 of the boss 34 is preferably 0.025–0.030 inch.

The present invention has been tested with a fastener sleeve formed of 5056 alloy aluminum and a mandrel formed of hardened steel, dimensioned as specified in the above example. The hardened steel mandrel 12 has a relatively high break load which provides for a large variance between the force required to upset the fastener sleeve tubular portion 30 and that required to break the hardened steel mandrel stem 22. The axial cross section of the boss 34 is configured so that deformation of the boss material begins soon after the sleeve tubular portion 30 has been upset and the workpiece members 42, 44 have been clinched together. The beginning and ending of deformation is largely dictated by the radial cross-sectional area of the boss 34 at its top surface 103 and where it meets the outer flange face 96. The configuration of the side surface 101 dictates the progression and direction of deformation. For example, in the ¼ inch nominal shank diameter sleeve 14 example discussed above, used with a hardened steel mandrel 12, the sleeve tubular portion 30 begins to be upset at around 1,300–1,350 pounds pulling force. At approximately 1,400 pounds pulling force, the sleeve tubular portion 30 is fully upset. The boss 34 is configured so that it begins to deform at around 1,600 pounds pulling force and progressively deform with application of a greater load. The boss 34 is designed to end deforming at around 2,200 pounds pulling force. The mandrel stem 22 is designed to break at the breakneck groove 56 upon reaching approximately 2,250 pounds pulling force.

It will be understood that the present invention may be employed with a boss 34 having other than a frusto-conical side 101. A cylindrical boss will not work well, however, because it tends to deform both radially inwardly and outwardly, resembling a mushroom in cross-section. Use of a boss 34 wherein the diameter of the top 103 is smaller than its base diameter 106 enables deformation of the boss material in such a manner as to obtain the benefits discussed above. One of ordinary skill in the fastener manufacturing art will recognize that the top and bottom boss diameters may be selected to obtain the desired deformation at the desired load increments, depending, of course, on the material employed for the mandrel 12 and sleeve 14.

Figure 8:
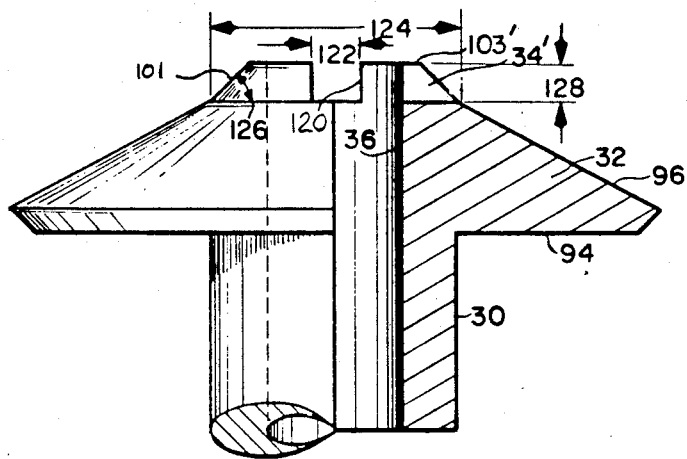
FIG. 8 is a partial cross-sectional detail view of the sleeve of an alternate embodiment of the present invention.
Figure 9:
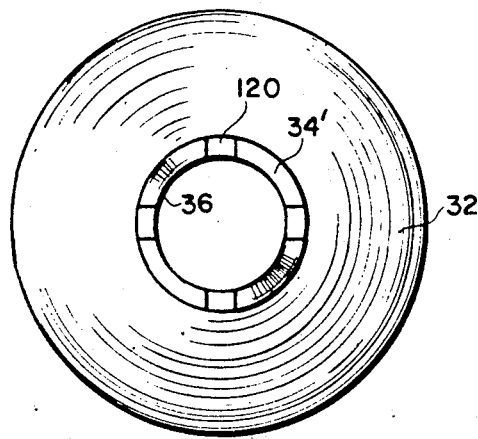
FIG. 9 is a top view of the sleeve of FIG. 8.

Referring to FIG. 8, an alternate embodiment of the boss 34 is shown as an axial protrusion formed of a series of segments 34'. These segments 34' may be cold formed or formed by an additional cutting operation in which slots 120 are cut into a boss 34 as shown in the preferred embodiment. The added complexity and cost of cold forming or cutting slots, however, serves to eliminate some of the advantage gained by elimination of the undercut of the prior art. The slots 120 produce individual segments 34' which may be of a height substantially greater than that of the boss 34 of the preferred embodiment to provide volume necessary to fill the locking groove 54. For example, in a ¼ inch nominal mandrel diameter fastener, it has been found convenient to utilize a series of four protrusion segments 34' created by slots 120 of a width 122 approximately 0.062 inch. The outer diameter 124 of the protrusion segments 34' is approximately 0.250 inch. The frusto-conical side surface 101 of the protrusion segment 34' forms an angle 126 of approximately 70° with the planar boss top 103. The height 128 of protrusion segments 34' is approximately 0.050 inch.

Figure 10:
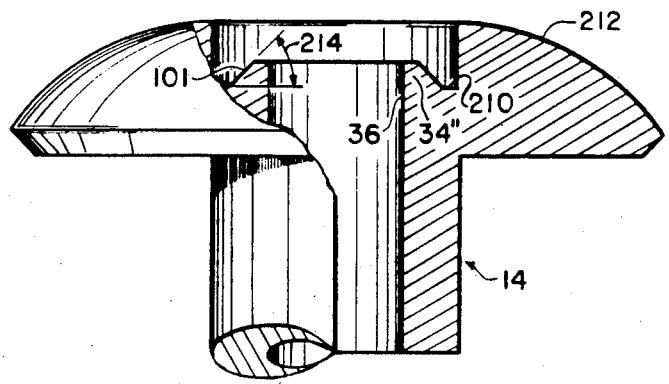
FIG. 10 is a partial cross-sectional detail view of the sleeve of another alternate embodiment of the present invention.
Figure 11:
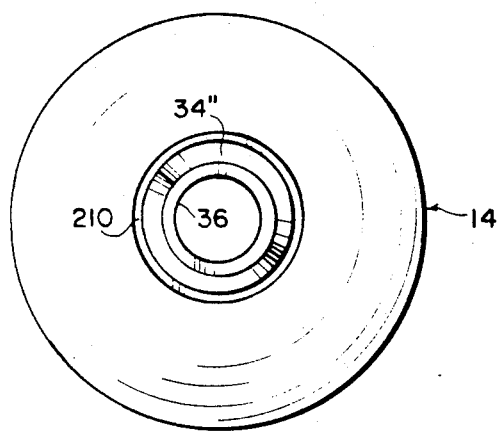
FIG. 11 is a top view of the sleeve of FIG. 10.

Referring to FIGS. 10 and 11, another alternate embodiment of the fastener sleeve 14 of the present invention is shown. This embodiment has a recess 210 arranged about the bore 36 in the flange outer face 212. This recess is used to shield the rough broken portion 92 of the installed fastener from contacting and injuring another surface or a person. For example, recessed flange fasteners are used in automotive applications where the broken portion is likely to be contacted by a driver or other occupant of the automobile, such as the fasteners under a door handle. It can be readily seen from FIGS. 10 and 11 that the boss 34" of the present invention may be used within the recess 210 of a recessed flange fastener. It has been found convenient to form the boss 34" with a radially outer side surface 101 similar to that of the preferred embodiment, namely with an angle 214 between the boss side surface 101 and a plane perpendicular to the axis of the fastener sleeve 14 of 35° to 60°, preferably 45°. As with the preferred embodiment, this angle may work marginally at angles as low as 20° in certain limited circumstances.

It will be understood that the present invention provides an improved fastener with integral locking means which are both economical and reliable. It will also be evident that, while a particular embodiment has been illustrated and described, various modifications may be made within the spirit and scope of the invention.

What is claimed is:

1. A fastener sleeve for use with a mandrel having an enlarged head and a generally cylindrical stem with a locking groove therearound to securely and economically fasten a plurality of members, comprising:
    a generally tubular portion for abutting the mandrel head and surrounding a portion of the mandrel stem adjacent the mandrel head;
    a flange extending radially from the end of the tubular portion opposite said mandrel head, said flange having an axially inner face adjacent said tubular portion and an axially outer face distal said tubular portion; and
    a protrusion extending axially from said flange opposite said tubular portion, said protrusion being dimensioned so as to begin deforming upon application of axial compression thereto after said tubular portion has been upset, the members have been compressed, and the mandrel stem has been elongated, and to substantially fill the mandrel locking groove before the mandrel stem breaks, wherein said protrusion is a plurality of segments.

2. The sleeve of claim 1, wherein said plurality is four.

3. A method of installing a fastener having a mandrel with an enlarged head and a generally cylindrical stem with a locking groove therearound and having a sleeve with a generally tubular portion abutting the mandrel head and surrounding a portion of the stem adjacent the head, a flange extending radially outward from the end of the tubular portion opposite the mandrel head, the flange having a planar axially inner face adjacent the tubular portion and an axially outer face distal the tubular portion, and a protrusion extending without an undercut in the protrusion or the outer flange face axially from the flange opposite said tubular portion and having an axially inner end joining the flange and a planar axially outer end spaced therefrom, into a workpiece having a plurality of members, comprising:
    inserting the fastener mandrel head and sleeve tubular portion into the workpiece;
    placing a powered fastener installation device nosepiece having a planar surface about the mandrel stem and against the protrusion outer end;
    gripping the mandrel stem with jaws provided in the powered fastener installation device;
    simultaneously pulling the mandrel stem axially away from the workpiece and pushing the sleeve protrusion axially toward the workpiece;
    upsetting the sleeve tubular portion;
    compressing the workpiece members;
    elongating the mandrel stem;
    displacing material from the protrusion into the mandrel locking groove solely by axially compressing the protrusion with the nosepiece until the locking groove is substantially filled; and
    breaking the mandrel stem at a predetermined location.

4. The method of claim 3, wherein the displacing step results in the protrusion being substantially flattened into the flange outer face.

5. A fastener for securely and economically fastening a plurality of workpiece members, comprising:
    a mandrel having:
        an enlarged head; and
        a generally cylindrical stem with a first end attached to said head and a locking groove therearound spaced from said head; and a sleeve having:
        a generally tubular portion interposed between said stem and said workpiece members, said tubular portion having a first end proximate said mandrel head and a second end distal said mandrel head;
        an upset portion at said first end of said tubular portion; and
        a flange extending radially outward from said second end of said tubular portion, said flange having a planar axially inner face adjacent said tubular portion and an axially outer face opposite said tubular portion, wherein said sleeve is locked to said mandrel by means of flange material displaced into said locking groove by the method comprising the steps:
            inserting the fastener mandrel head and sleeve tubular portion into the workpiece;
            placing a powered fastener installation device nosepiece having a planar surface about the mandrel stem and against a protrusion extending axially from said flange opposite said tubular portion and having an axially inner end joining the flange and a planar axially outer end spaced therefrom;
gripping the mandrel stem with jaws provided in the powered fastener installation device;
simultaneously pulling the mandrel stem axially away from the workpiece and pushing the sleeve protrusion axially toward the workpiece;
upsetting the sleeve tubular portion to form said upset portion;
compressing the workpiece members;
elongating the mandrel stem; and
displacing material from the protrusion into the mandrel locking groove solely by axially compressing the protrusion with the nosepiece until the locking groove is substantially filled.

6. The fastener of claim 5, wherein said flange outer face is frusto-conical.

7. The fastener of claim 6, wherein said frusto-conical flange outer face forms an angle of 20–25° with a plane perpendicular to the axis of said stem.

8. The fastener of claim 5, wherein said protrusion is recessed in said flange.

* * * * *